Aug. 28, 1928.
F. CUNICO
1,682,600
PEELING MACHINE
Filed May 9, 1927
2 Sheets-Sheet 1
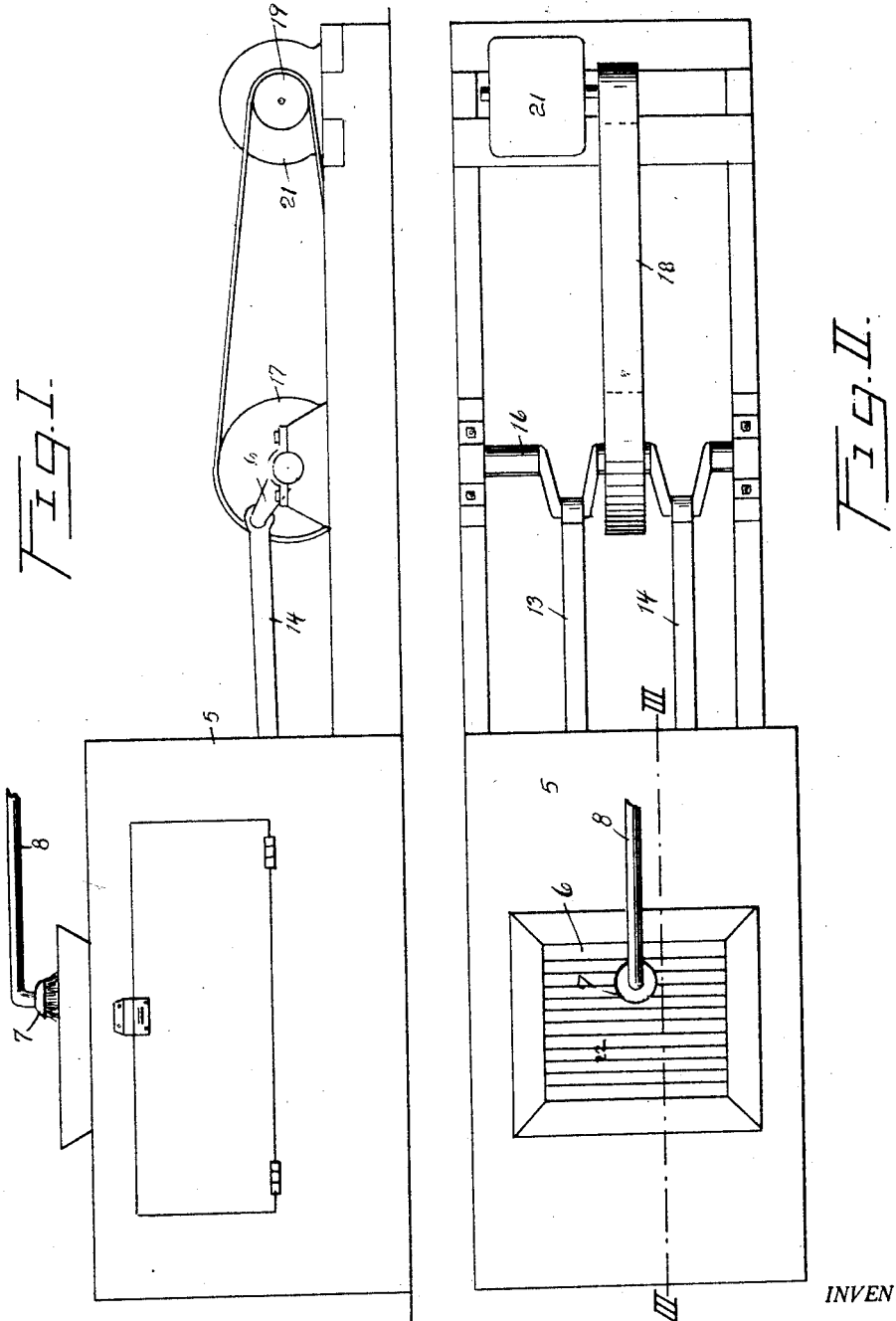
INVENTOR.
F. CUNICO
BY *Victor J. Evans*
ATTORNEY.

Aug. 28, 1928.
F. CUNICO
1,682,600
PEELING MACHINE
Filed May 9, 1927   2 Sheets-Sheet 2
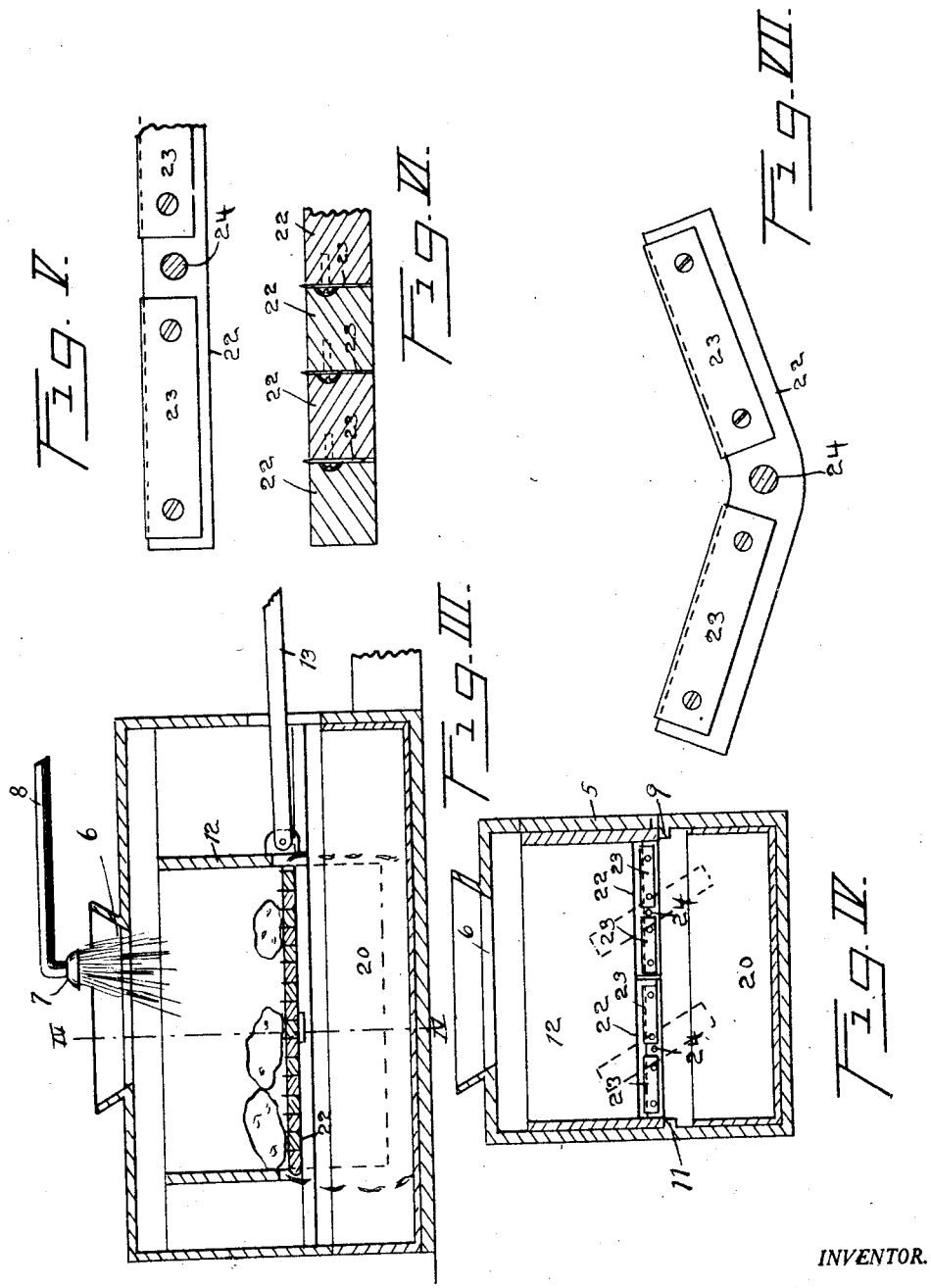
INVENTOR.
F. CUNICO
BY Victor J. Evans
ATTORNEY.

Patented Aug. 28, 1928.

1,682,600

UNITED STATES PATENT OFFICE.

FRANK CUNICO, OF SAN FRANCISCO, CALIFORNIA, ASSIGNOR OF ONE-HALF TO ITALO POLITI, OF SAN FRANCISCO, CALIFORNIA.

PEELING MACHINE.

Application filed May 9, 1927. Serial No. 190,055.

This invention relates to improvements in peeling machines, and has particular reference to a device for the removing of peel from fruits and vegetables.

The principal object of this invention is to provide a device wherein a relatively thin peel will be taken from the vegetable or fruit placed therein, thereby eliminating waste customarily found in peelers.

A further object is to provide a device which is simple in construction, and therefore one which will not become easily disarranged.

A further object is to provide means whereby the paring elements may be readily removed for sharpening or replacement.

A still further object is to provide means whereby peeling elements of various shapes may be substituted for each other for the purpose of handling different shaped fruits or vegetables.

Other objects and advantages will be apparent during the course of the following description.

In the accompanying drawings forming a part of this specification, and in which like numerals designate like parts throughout the same, Figure I is a side elevation of my invention, Figure II is a top plan view of Figure I, Figure III is a vertical cross-section taken on the line 3—3 of Figure II, Figure IV is a vertical cross-section taken on the line 4—4 of Figure III, Figure V is a fragmentary detail view on an enlarged scale showing the manner in which the knives are secured in the device, Figure VI is a cross-section of the peeling element showing the position of the knives, and Figure VII is a modified form of peeling element wherein the knives are inclined with respect to each other.

Applicant is aware of the fact that many forms of peeling machines have been devised operating on various principles. The disadvantage of these machines is that the wastage is very heavy due to the thick peelings cut from the produce being peeled. With my improved device, the action of the peeling element simulates a scraping action and therefore but a very small amount of usuable produce is wasted.

In the accompanying drawings wherein for the purpose of illustration is shown a preferred embodiment of my invention, the numeral 5 designates a box-like structure having a filling opening 6 in the top thereof. Positioned above this filling opening is a spray head 7 adapted to receive water from an inlet pipe 8. Within this box-like structure are tracks 9 and 11 upon which a shaking box 12 is adapted to slide.

This shaking box 12 has connected thereto a pair of pitman rods 13 and 14 which are in turn connected to a crank shaft 16 upon which a pulley 17 is positioned. The pulley is rotated through the medium of a belt 18 passing over a pulley 19 carried upon a motor 21, which motor may be driven by electricity or any other suitable source of power supply.

The shaking box 12 has a bottom formed of slats 22, to the sides of which are secured knives 23. These slats are pivotally supported by a rod 24 which rod extends from end to end of the shaking box in such a manner that the bottom thus formed may be tipped for the purpose of dumping the produce after the same has been peeled.

I preferably employ two sets of slats which permits the bottom to be dumped as indicated in dotted lines of Figure IV.

In Figure VII I have shown a modified form of slat which has its ends bent so that the knives when attached thereto are at an angle with respect to each other.

The result of the construction above described is that when the motor 21 is running and power is transmitted to the belt 18, through the pulley 17 thence through the shaft 11 to the pitman rods 13 and 14, the result will be that the box 12 is given a rapid back and forth movement and due to the inertia of the commodity therein and assuming that we are peeling potatoes, it will be evident that as the box moves first in one direction and then in the opposite direction, the potatoes on the bottom thereof will be engaged by the knives of the peeling elements and given a slight scraping at each movement.

It has been found by experience that the potatoes within the box are agitated with the result that as the potatoes drop down upon the knives, the skin is cut thereby permitting a much better scraping action than where the skin has to be broken in counter distinction to being cut. The spray head discharges water over the potatoes during the peeling process, the result being that the potatoes are deposited from the shaking element into a suitable receptacle in the bottom of the device. This receptacle is designated by the numeral 20.

It will thus be seen that I have produced a device for peeling potatoes and other vegetables, which is simple and one which will accomplish all of the objects above set forth.

It is to be understood that the form of my invention herewith shown and described is to be taken as a preferred example of the same and that various changes relative to the shape, size, material and arrangement of parts may be resorted to without departing from the spirit of the invention or the scope of the subjoined claims.

Having thus described my invention, I claim:—

1. In a peeling apparatus of the character described, a shaking element, a peeling element positioned in the bottom of said shaking element, said peeling element including a plurality of vertically disposed knives spaced from each other.

2. In a peeling device a box-like structure a shaking element positioned within said box-like structure, said shaking element having a horizontal rod extending the length of said shaking element a plurality of slats pivotally positioned thereon and knives secured to said slats so as to be positioned therebetween.

3. In a peeling device a shaking element, a rod horizontally positioned in said shaking element, a plurality of slats pivotally supported on said rod, knives secured to said slats on opposite sides of their pivotal support, said knives extending to a point above the surface of said slats, when said slats are in assembled relation.

In testimony whereof I affix my signature.

FRANK CUNICO.